United States Patent [19]

Maruyamano et al.

[11] Patent Number: 4,655,335
[45] Date of Patent: Apr. 7, 1987

[54] CLUTCH RELEASE MECHANISM

[75] Inventors: Satoru Maruyamano; Hisao Ohtani, both of Toyota, Japan

[73] Assignee: Toyota Jidosha Kabushiki Kaisha, Aichi, Japan

[21] Appl. No.: 694,154

[22] Filed: Jan. 23, 1985

[30] Foreign Application Priority Data

Jan. 26, 1984 [JP] Japan .................. 59-13765

[51] Int. Cl.⁴ ............................. F16D 23/12
[52] U.S. Cl. ................. 192/99 S; 192/70.13; 192/115
[58] Field of Search ............. 192/99.S, 70.3, 70.13, 192/115, 99 R, 99 A, 70.27, 70.29; 16/259; 74/519; 29/402.01, 402.03, 402.08

[56] References Cited

U.S. PATENT DOCUMENTS

| | | | |
|---|---|---|---|
| 1,830,840 | 11/1931 | Kienzle | 192/99 S |
| 2,497,337 | 2/1950 | Ackerman | 16/259 X |
| 3,335,833 | 8/1967 | Smirl | 192/99 S X |
| 4,405,041 | 9/1983 | Broadbent | 192/99 S X |
| 4,529,077 | 7/1985 | Renaud | 192/99 S |

FOREIGN PATENT DOCUMENTS

| | | | |
|---|---|---|---|
| 937720 | 9/1963 | United Kingdom | 192/99 S |
| 1334573 | 10/1973 | United Kingdom | 192/70.3 |

Primary Examiner—Rodney H. Bonck
Assistant Examiner—David A. Testardi
Attorney, Agent, or Firm—Parkhurst & Oliff

[57] ABSTRACT

A clutch release mechanism permitting a center fulcrum type release fork to be installed or removed under such condition that a clutch housing is fixed to a cylinder block, so as to simplify installation of the release fork in a production step and also simplify subsequent exchange of the release fork. The clutch release mechanism comprises a release fork having a pair of forked arms and adapted to be inserted from a fork insertion hole formed through a part of a clutch housing and mounted to a bearing hub of a clutch release bearing in a direction perpendicular to an axis of the bearing hub so as to be interlocked with the bearing hub, a fulcrum pin fixed to base portions of the forked arms of the release fork at both ends thereof, and a fork support fixed to an inside wall of the clutch housing for rotatably supporting the fulcrum pin.

6 Claims, 3 Drawing Figures

CLUTCH RELEASE MECHANISM

BACKGROUND OF THE INVENTION

This invention relates to a clutch release mechanism including a center fulcrum type release fork for providing a certain slide operation to a clutch bearing by hydraulic pressure or action of a cable accompanied by depression of a clutch pedal.

Generally, a center fulcrum type release fork is rotatably sphere-supported at its substantially central portion by a fulcrum member (e.g., fork ball) mounted on a certain part in a clutch housing. Owing to this structure, the release fork is required to be installed before a clutch housing is fixed to a cylinder block, and accordingly it is difficult to install or remove the release fork under such condition that the clutch housing is fixed to the cylinder block. For this reason, it has been considered to be impossible that the release fork is exchanged without removing the clutch housing from the cylinder block.

SUMMARY OF THE INVENTION

Accordingly, it is an object of the present invention to provide a clutch release mechanism which permits a center fulcrum type release fork to be installed or removed under such condition that a clutch housing is fixed to a cylinder block.

It is another object of the present invention to provide a clutch release mechanism which may simplify installation of the release fork in a production step and also simplify subsequent exchange of the release fork.

The clutch release mechanism of the present invention comprises a release fork having a pair of forked arms and adapted to be inserted from a fork insertion hole formed through a part of a clutch housing and mounted to a bearing hub of a clutch release bearing in a direction perpendicular to an axis of the bearing hub so as to be interlocked with the bearing hub, a fulcrum pin fixed to base portions of the forked arms of the release fork at both ends thereof, and a fork support fixed to an inside wall of the clutch housing for rotatably supporting the fulcrum pin.

These and other features, objects and advantages of this invention will be more apparent from the following detailed description and the accompanied drawings.

DETAILED DESCRIPTION OF THE PREFERRED EMBODIMENTS

Figure 1:
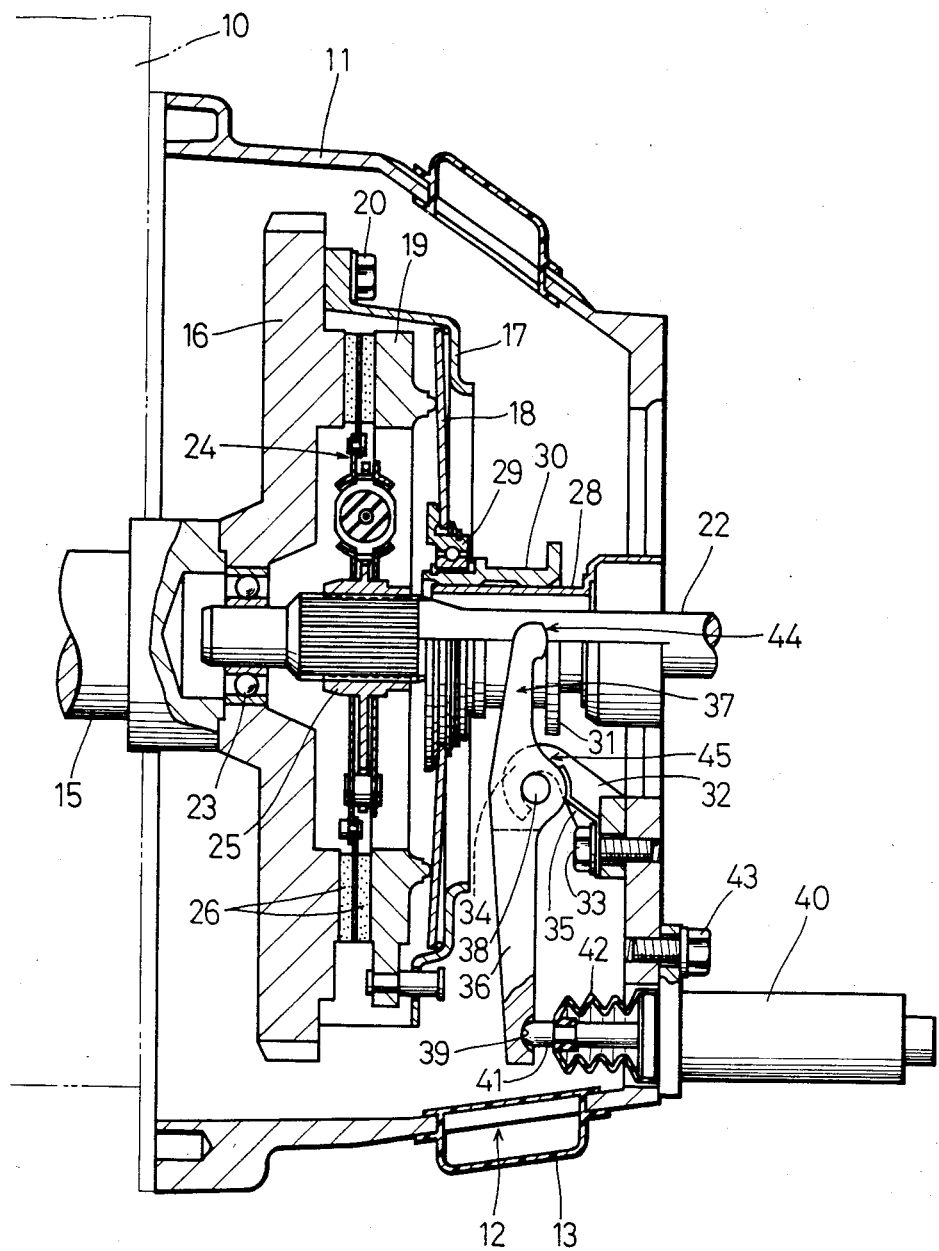
FIG. 1 is a sectional view of a clutch.

Referring now to FIG. 1 which shows a sectional view of a friction clutch for a vehicle, reference numerals 10 and 11 designate a cylinder block of an engine and a clutch housing fixed to the cylinder block 10. A fly wheel 16 is fixed to an end portion of a crank shaft 15 of the engine in the clutch housing 11 in a known manner, and is designed to be rotated with the crank shaft 15. A clutch cover 17 is fixed by bolts 20 to the fly wheel 16, and a diaphragm spring 18, pressure plate 19 and other constitutional members are installed as an assembly in the clutch cover 17.

An input shaft 22 of a transmission (not shown) is arranged at a rotary shaft portion of a clutch under such condition that it is rotatably supported at one end thereof to a central portion of the fly wheel 16 by a pilot bearing 23. A hub 25 of a clutch disc 24 is supported to a spline formed on an outer circumference of the input shaft 22 in such a manner as to be slidable along an axis of the spline and be unrotatable relative to the spline. Facings 26 of the clutch disc 24 are interposed between the fly wheel 16 and the pressure plate 19, and are strongly held by the fly wheel 16 and the pressure plate 19 on the basis of a mount load of the clutch cover 17, that is, a set resilient force of the diaphragm spring 18. With this arrangement, torque may be transmitted from the fly wheel 16 (inclusive of the clutch cover 17, the pressure plate 19 and the other members as assembled with the fly wheel 16) through the clutch disc 24 to the input shaft 22.

A bearing hub 30 having a pull type release bearing 29 is axially slidably mounted on an outer circumference of a cylindrical portion 28 of a front bearing retainer arranged coaxially with the input shaft 22 in the transmission. An outer race of the release bearing 29 is engaged with lever ends (inner circumferential edges) of the diaphragm spring 18.

Figure 2:
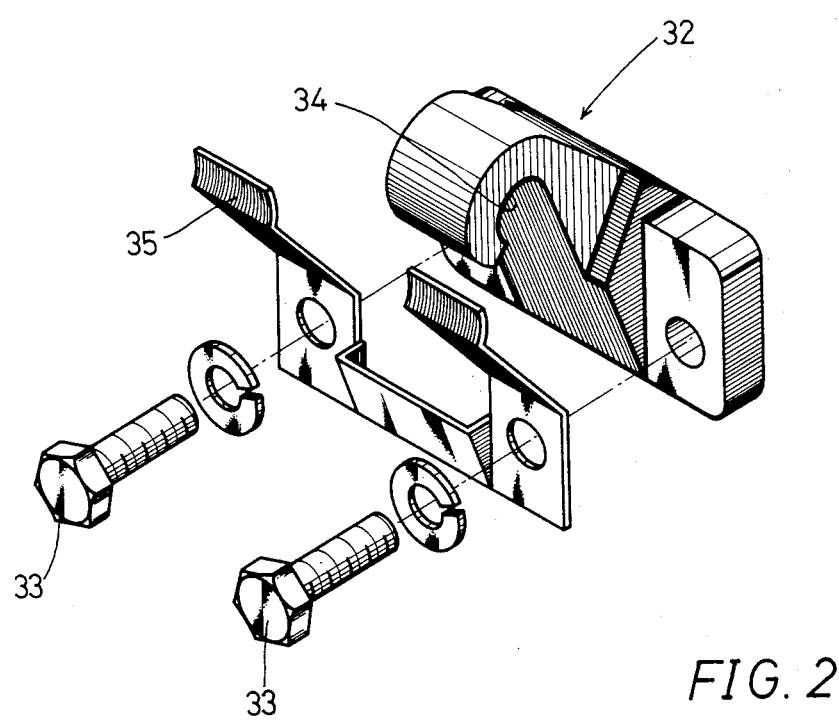
FIG. 2 is a perspective view of a fork support and its associated members.

As is best seen in FIG. 2, a fork support 32 is fixed by two bolts 33 to an inside wall of the clutch housing 11. The fork support 32 is formed with a hook portion 34 having an opening portion directed oppositely to a fork insertion hole 12 as formed through a part of the clutch housing 11. Both the bolts 33 serve to fix the fork support 32 as well as a fork spring 35 formed of a leaf spring material.

Figure 3:
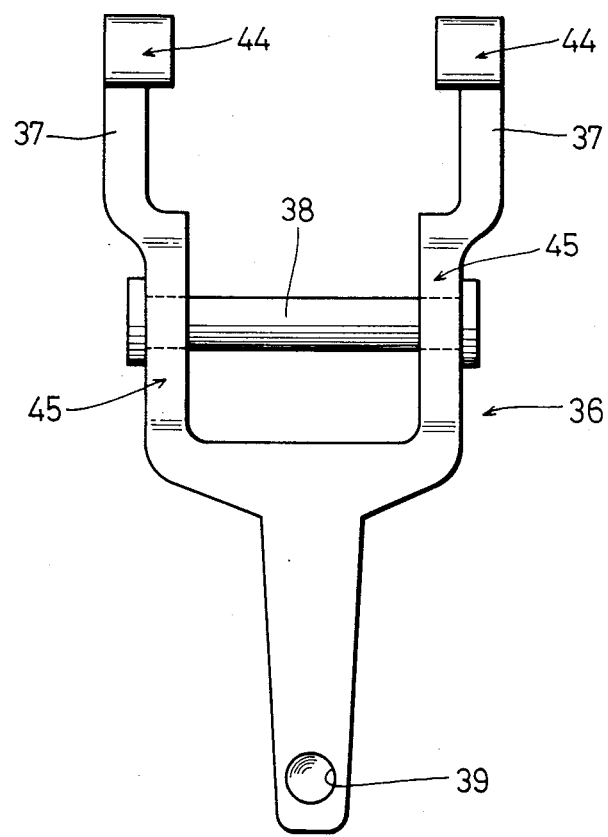
FIG. 3 is an enlarged plan view of a center fulcrum type release fork as viewed from a right-hand side in FIG. 1.

As shown in FIG. 3, a center fulcrum type release fork 36 is formed with a pair of forked arms 37 at an end thereof, and a fulcrum pin 38 is fixed by caulking and the like to base portions of the forked arms 37 as connecting the same. As shown in FIG. 1, the fulcrum pin 38 is rotatably supported to the hook portion 34 of the fork support 32, and the forked arms 37 are so arranged as to sandwich the bearing hub 30 from opposite sides thereof. Under the condition, a pair of projected portions 45 of the forked arms 37 are supported by abutting against the fork spring 35 which acts to bias the release fork 36 in a left-hand direction as viewed in FIG. 1. As a result, the fulcrum pin 38 of the release fork 36 is pressed against the hook portion 34 of the fork support 32, and at the same time, a pair of arcuate surfaces 44 formed at free ends of the fork arms 37 are pressed against a flange 31 of the bearing hub 30. (See FIG. 1.) In such an installed condition as above, the release fork 36 is stable in installation, and therefore it is prevented from being disengaged from the fork support 32. The release fork 36 is further formed at an end portion thereof on opposite side of the forked arms with a recessed portion 39 for receiving an end of a push rod 41 of a release cylinder 40 as will be hereinafter described.

The release cylinder 40 of a hydraulic clutch release system is fixed by bolts 43 to a part of the clutch housing 11. The push rod 41 of the release cylinder 40 is in abutment against the recessed portion 39 of the release fork 36 in the clutch housing 11. Reference numeral 42 designates a dust boot of the release cylinder 40.

In operation, when a clutch pedal (not shown) is depressed, hydraulic pressure is fed from a master cylinder (not shown) into the release cylinder 40, and a piston (not shown) in the release cylinder 40 is moved leftwardly as viewed in FIG. 1. As a result, the release fork 36 is rotated clockwise in FIG. 1 about the fulcrum pin 38 relative to the fork support 32, and accordingly the release bearing 29 as well as the bearing hub 30 are slided rightwardly in FIG. 1 along the outer circumferential portion 28 of the front bearing retainer, whereby the diaphragm spring 18 is displaced together with the pressure plate 19 in the same direction as above. As a result, the holding force due to the resilient force of the diaphragm spring 18 against the clutch disc 24 is released, and a torque transmission between the fly wheel 16 and the input shaft 22 is broken to render the clutch in disengaged condition.

In installation of the release fork 36 under the condition where the clutch housing 11 is mounted to the cylinder block 10 of the engine, and the constitutional members of the clutch and the input shaft 22 of the transmission are installed in the clutch housing 11, and at this stage, a dust cover 13 is not mounted to the fork insertion hole 12 as formed through a part of the clutch housing 11, first the forked arms 37 of the release fork 36 are inserted through the fork insertion hole 12 into the clutch housing 11. Then, the fulcrum pin 38 of the release fork 36 is engaged with the hook portion 34 of the fork support 32, and simultaneously the forked arms 37 of the release fork 36 are engaged with an outer circumference of the bearing hub 30 of the release bearing 29. At the same time, the projected portions 45 of the forked arms 37 are supported by the fork spring 35, thus permitting a stable installation of the release fork 36 and preventing fall-down of the same.

Thereafter, the release cylinder 40 is fixed by the bolts 43 to the clutch housing 11, and the end of the push rod 41 is made in abutment against the recessed portion 39 of the release fork 36. Thus, installation of the release fork 36 and the release cylinder 40 is completed, and then the dust cover 31 is mounted to the fork insertion hole 12 of the clutch housing 11.

Further, in the case that the release fork 36 is removed for purpose of exchange, for example, a reverse procedure as of the above procedure may be carried out with the clutch housing 11 fixed to the cylinder block 10.

While the invention has been described with reference to specific embodiments, the description is illustrative and is not to be construed as limiting the scope of the invention. Various modifications and change may occur to those skilled in the art without departing from the spirit and scope of the invention as defined by the appended claims.

What is claimed is:

1. A clutch release mechanism comprising a release fork having a pair of forked arms mounted to a bearing hub of a clutch release bearing in a direction perpendicular to an axis of said bearing hub so as to be interlocked with said bearing hub, a fulcrum pin fixed to base portions of said forked arms of said release fork at both ends thereof, a fork support fixed to an inside wall of a clutch housing and having a hook portion for receiving and rotatably supporting said fulcrum pin, and a fork insertion hole formed through a part of said clutch housing, said release fork being adapted to be inserted and removed through said fork insertion hole.

2. The clutch release mechanism as defined in claim 1, wherein said hook portion has an opening portion directed opposite to said fork insertion hole.

3. The clutch release mechanism as defined in claim 1, wherein said fork support is fixed by bolts through a fork spring formed of a leaf spring material to said inside wall of said clutch housing.

4. The clutch release mechanism as defined in claim 3, wherein said release fork comprises a plurality of projected portions to be biased by said fork spring.

5. The clutch release mechanism as defined in claim 4, wherein said fork spring is formed with abutment portions adapted to biasingly support said release fork.

6. The clutch release mechanism as defined in claim 5, wherein said abutment portions have arcuate surfaces closely abutting against said projected portions of said release fork.

* * * * *